(12) United States Patent
Feehrer

(10) Patent No.: US 7,689,751 B2
(45) Date of Patent: Mar. 30, 2010

(54) PCI-EXPRESS SYSTEM

(75) Inventor: John R. Feehrer, Westford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 96 days.

(21) Appl. No.: 12/031,913

(22) Filed: Feb. 15, 2008

(65) Prior Publication Data

US 2009/0210606 A1 Aug. 20, 2009

(51) Int. Cl.
*G06F 3/00* (2006.01)
*G06F 13/00* (2006.01)

(52) U.S. Cl. .......................................... 710/301; 710/10

(58) Field of Classification Search ...................... 710/8, 710/10, 104, 301
See application file for complete search history.

(56) References Cited

U.S. PATENT DOCUMENTS

| | | | |
|---|---|---|---|
| 6,772,263 B1 | 8/2004 | Arramreddy | |
| 7,209,991 B2* | 4/2007 | Chappell | ..................... 710/240 |
| 7,257,659 B2 | 8/2007 | Martin et al. | |
| 7,519,761 B2* | 4/2009 | Gregg | ......................... 710/316 |
| 7,535,254 B1* | 5/2009 | Case | ............................ 326/39 |
| 2003/0158992 A1 | 8/2003 | Ajanovic et al. | |
| 2004/0044817 A1 | 3/2004 | Thurlo et al. | |
| 2007/0076005 A1* | 4/2007 | Knepper et al. | ............. 345/520 |
| 2007/0150762 A1* | 6/2007 | Sharma et al. | .............. 713/300 |
| 2007/0263642 A1* | 11/2007 | Harriman | .................... 370/401 |
| 2008/0104378 A1* | 5/2008 | Huang et al. | .................... 713/1 |
| 2008/0235429 A1* | 9/2008 | Gundam et al. | ............. 710/313 |
| 2009/0044044 A1* | 2/2009 | Harter et al. | .................... 714/6 |

OTHER PUBLICATIONS

PCI Express Base Specification Revision 1.0 Jul. 22, 2002.*
Overview to changes to PCI Express Specification 1.1, Mindshare, Jun. 2005.*
PCI-SIG Engineering Change Notice. Vendor-Specigic Extended Capability (VSEC), Jan. 7, 2004.*

* cited by examiner

*Primary Examiner*—Paul R Myers
(74) *Attorney, Agent, or Firm*—Brooks Kushman P.C.

(57) ABSTRACT

A method and system to facilitate Peripheral Component Interconnect Express (PCIe). The PCIe may be facilitated in such as way as to limit pins consumed by a Root Complex, switch, or other chipset included on the same die a central processing unit (CPU). A slot interface card (SIC) or other devices having less expensive pins may be used to connect to and communicate with the slot.

17 Claims, 4 Drawing Sheets

PCI-EXPRESS SYSTEM

BACKGROUND OF THE INVENTION

Field of the Invention

The present invention relates to a Peripheral Component Interconnect Express (PCIe) systems.

SUMMARY OF THE INVENTION

PCI-Express (PCIe) defines a format to facilitate communications between a processor and peripheral devices, referred to as PCIe devices. FIG. 1 illustrates a PCIe system having a Root Complex or Switch configured to facilitate communications and other operations defined in the PCIe specification. A portion of the PCIe specification defines a number of registers in PCIe configuration space to control, configure, and monitor status for functions in PCIe devices, which may include the illustrated Vendor Specific Enhanced Capability Structure (VSEC), Slot Capabilities register, Slot Status Register, Slot Control Register, and other non-illustrated registers.

When software in the PCIe system initializes a bus probe to discover PCIe or other I/O devices, it queries their registers to determine capabilities and status information. Some of the capability register bits may be specified as type "HwInit" such that their values are dependent on the specific hardware/system platform. As illustrated in FIG. 1, a number of external pins electrically connect the integrated circuits or chipset of the registers/Root Complex to a printed circuit board (PCB). The external pins exchange signals with the PCIe device or other elements over traces (not shown) included on the PCB.

In some systems, pins are not readily available. This is especially true of the Root Complex, which increasingly is being integrated onto the same die as a CPU core(s) to build a System on Chip (SoC) where pin usage is extremely valuable.

BRIEF DESCRIPTION OF THE DRAWINGS

The present invention is pointed out with particularity in the appended claims. However, other features of the present invention will become more apparent and the present invention will be best understood by referring to the following detailed description in conjunction with the accompany drawings in which:

DETAILED DESCRIPTION OF THE PREFERRED EMBODIMENT(S)

Figure 2:
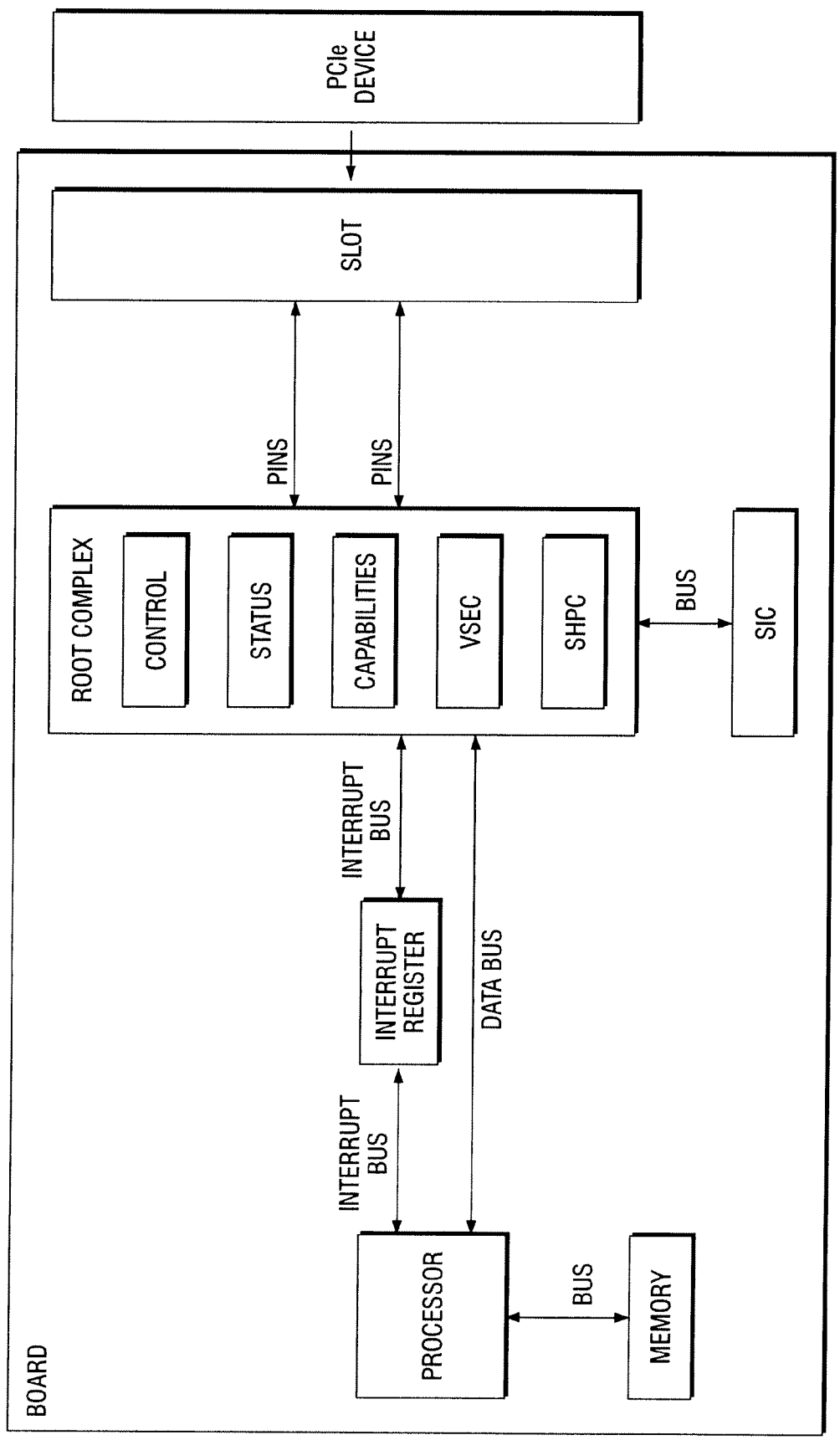
FIG. 2 illustrates a PCIe system in accordance with one non-limiting aspect of the present invention.

FIG. 2 illustrates a PCIe system in accordance with one non-limiting aspect of the present invention. The PCIe system may be configured to facilitate communications between a processor and peripheral PCIe device according to parameters defined in the PCIe specification. A portion of the PCIe specification defines configuration space that can be used to control, configure, and monitor status for PCIe devices. This configuration space is included within a Root Complex used to facilitate interactions with the processor. The Root Complex and its elements may be added to printed circuit board (PCB) or motherboard. The Root Complex may be configured according to PCIe requirements to interact with the processor through an interrupt bus connected to an interrupt register and through a data bus.

The Root Complex may include any number of elements to facilitate the operations contemplated by the present invention. A portion of the configuration space may include a number of PCIe registers, logically executing memory blocks, controllers and other elements to perform any number of PCIe operations. The configuration and contents of the configuration space may vary depending on the PCIe device, desired PCIe operations and any number of other variables. For exemplary purposes, and without intending to limit the scope and contemplation of the present invention, the present invention contemplates configuring the configuration space to support hot-plug operations.

A Standard Hot-Plug Controller (SHPC) may be included to facilitate the hot-plug operations. The SHPC controller may be configured to support hot-plug operations that enable PCIe devices to be plugged into a slot with requiring reboot if a PCIe device attaches to a slot having the electrical/mechanical features necessary to enable hot-plug. The hot-plug controller may rely on information stored in registers of the Root Complex to facilitate hot-plug related operations.

While this list is not exclusive, the Root Complex may include some combination of a capabilities register, status register, and control register to facilitate some of the hot-plug operations. The capability register may be configured to store information relating to the capabilities and optional features that are implemented for the PCIe device and the parameters necessary to their operation. The capabilities register may also store additional information, such as but not limited to link width and speed supported by the hardware. The status register may include information regarding the current settings or status of the slot, including attention button status, card present status, and power fault status. The control register may include information for setting/controlling power, clock, reset, indicator LEDs, and other functions for the slot.

The SHPC reads and writes information to the registers. Generally, if information is to be read from or written to the registers, the controller issues an interrupt to the interrupt register that then communicates the interrupt to the processor. The information included in the registers is manipulated according to the operation associated with the interrupt. The detailed operation of the SHPC and its interaction with the processor and Root Complex registers is beyond the explanatory needs of the present invention. One aspect of the SHPC and its interaction with the registers that is important to the present invention relates to the number of pins used to facilitate operations associated with the registers.

The principle pins of interest to the present invention are labeled as 'pins'. While other pins may be included for the registers and/or Root Complex, these pins are not labeled from the sake of clarity. For example, pins for communication buses are labeled as 'bus' to distinguish them from the other pins. And the pins or wires internal to the Root Complex are not shown for clarity. These internal pins connect the registers to traces having communications paths limited to the other elements within the Root Complex. The labeled pins may be characterized as external pins in so far as the pins connect to traces that extent beyond the boundaries of the Root Complex to the slot and the connected PCIe device.

The external pins may be part of the register packaging or the Root Complex packaging. In some microprocessor designs, the package size is often determined by the number of pins and not the size of the silicon die—meaning each pin adds cost to the system. One non-limiting aspect of the present invention contemplates limiting the number of external pins consumed by the Root Complex.

The present invention recognizes the cost to include pins is rather high when the pins are included as part of the Root Complex. This cost may be even higher when the Root Complex is part of the same die as a CPU core(s) to build a System on Chip (SoC). In comparison to FIG. 1, the system shown in FIG. 2 limits the number of pins by removing to the pins consumed in connecting the capabilities register to a non-volatile memory element.

The non-volatile memory element may be any feature, such as a DIP switch or EEPROM, that is programmed to set, or at least initially set, the capabilities register. In some applications, the capabilities register's bits are specified as 'HwInit' and set by the non-volatile memory according to the hardware and/or system requirements of the system. The present invention contemplates eliminating reliance on the non-volatile memory in favor of Root Complex programming.

A Vendor Specific Enhanced Capability Structure (VSEC) included within the Root Complex may be used to program the Slot Capabilities Register. The VSEC is a programmable element defined within the PCIe specification that can be programmed by vendors without disrupting or otherwise influencing operation of the PCIe and/or the SHPC. The VSEC may be defined to store any of the platform-specific information needed by the capabilities register. The VSEC may be hardwired to the Slot Capabilities Register so that the values in the capability register match the values in the VSEC, permitting an operating system to see the desired settings for the capabilities register without relying on external non-volatile memory to write the values.

Figure 1:
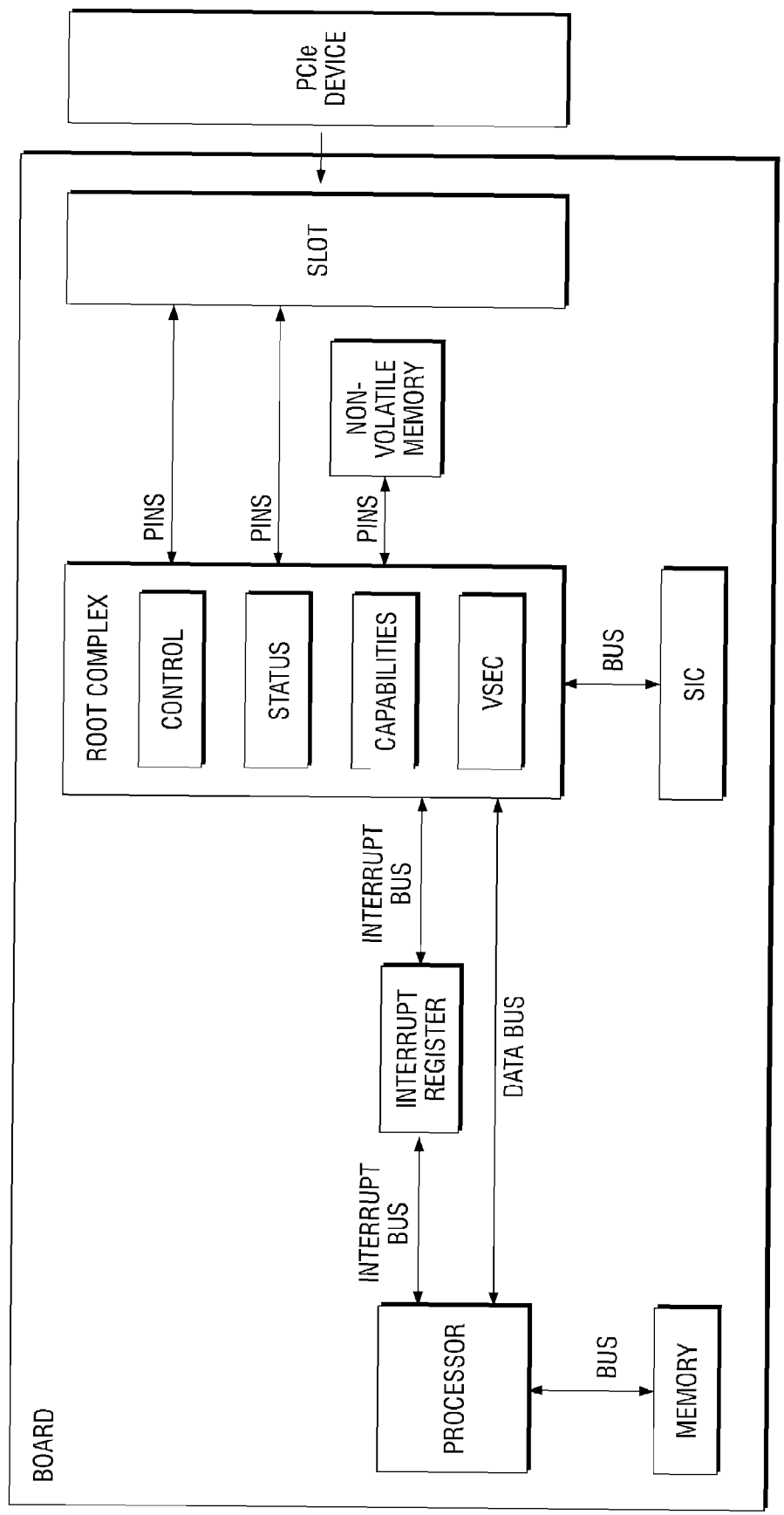
FIG. 1 illustrates a PCIe system having a Root Complex or switch configured to facilitate communications and other operations defined in the PCIe specification.
Figure 3:
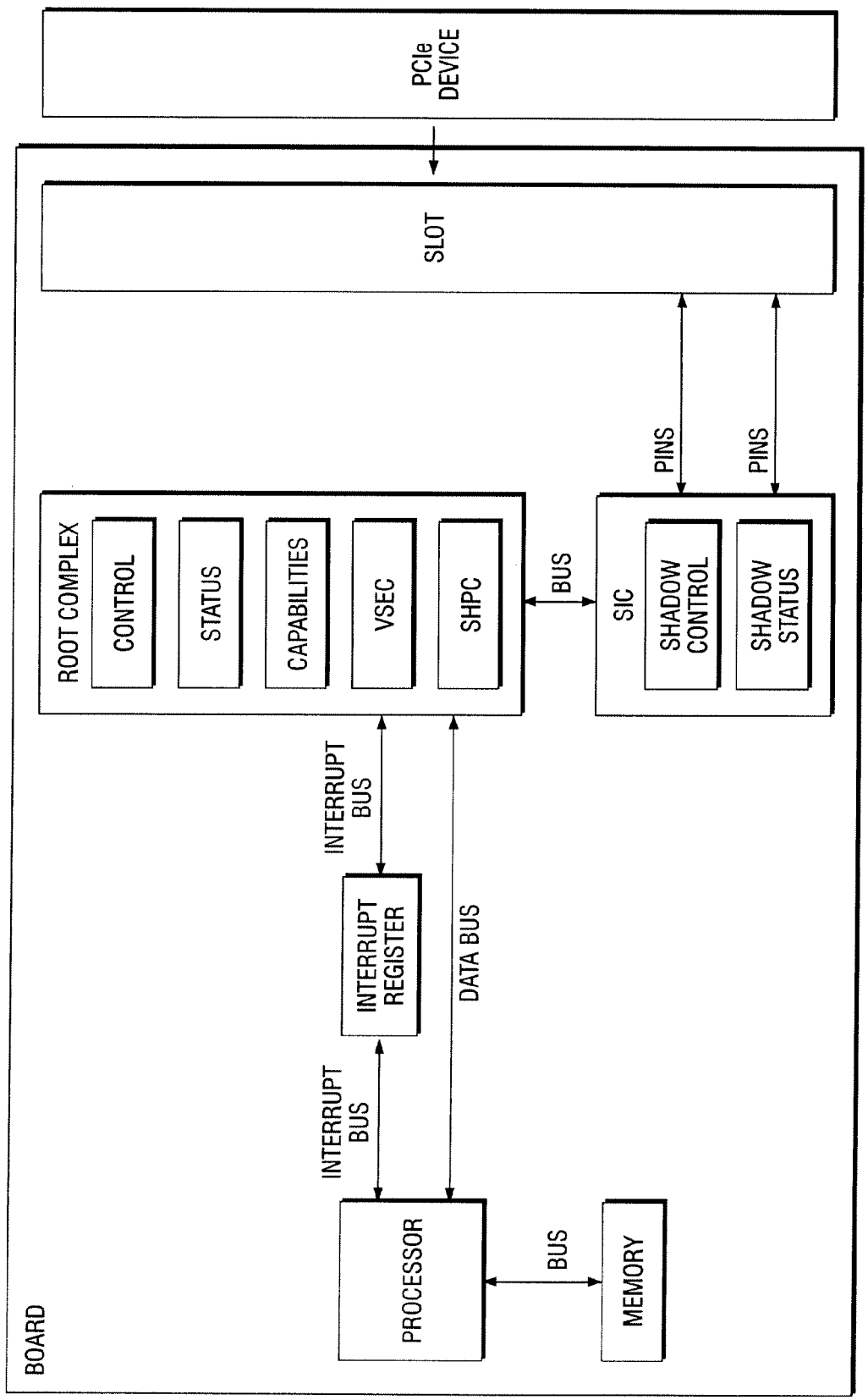
FIG. 3 illustrates a PCIe system in accordance with one non-limiting aspect of the present invention.

The system shown in FIG. 2 illustrates one of the pin reduction arrangements contemplated by the present invention. FIG. 3 illustrates another pin reduction arrangement contemplated by the present invention where the other pins illustrated in FIG. 1 are moved to a slot interface chip (SIC) connected to the Root Complex through a serial bus. The SIC is a relatively inexpensive chip found on just about any motherboard since it may be relied upon to perform a number of different operations, including some that are unrelated to PCIe and hot-plug operations. The present invention contemplates a pin savings with removal of the pins to the less expensive SIC or other similar feature, such as but not limited to a field programmable gate array (FPGA).

The SIC may be configured to include shadow registers for one or more of the registers included within the Root Complex, which for non-limiting, exemplary purposes, are shown to include shadows for the control and status registers. The shadow registers may be mirror images or copies of their shadowed registers such that they include the same bit values. The slot may be connected to the SIC so that the values in the shadow registers control slot operations, status, etc. as required by the PCIe, SHPC or other operating needs desired of the Root Complex. The values in the shadow registers may be read from and/or written to the Root Complex registers.

Figure 4:
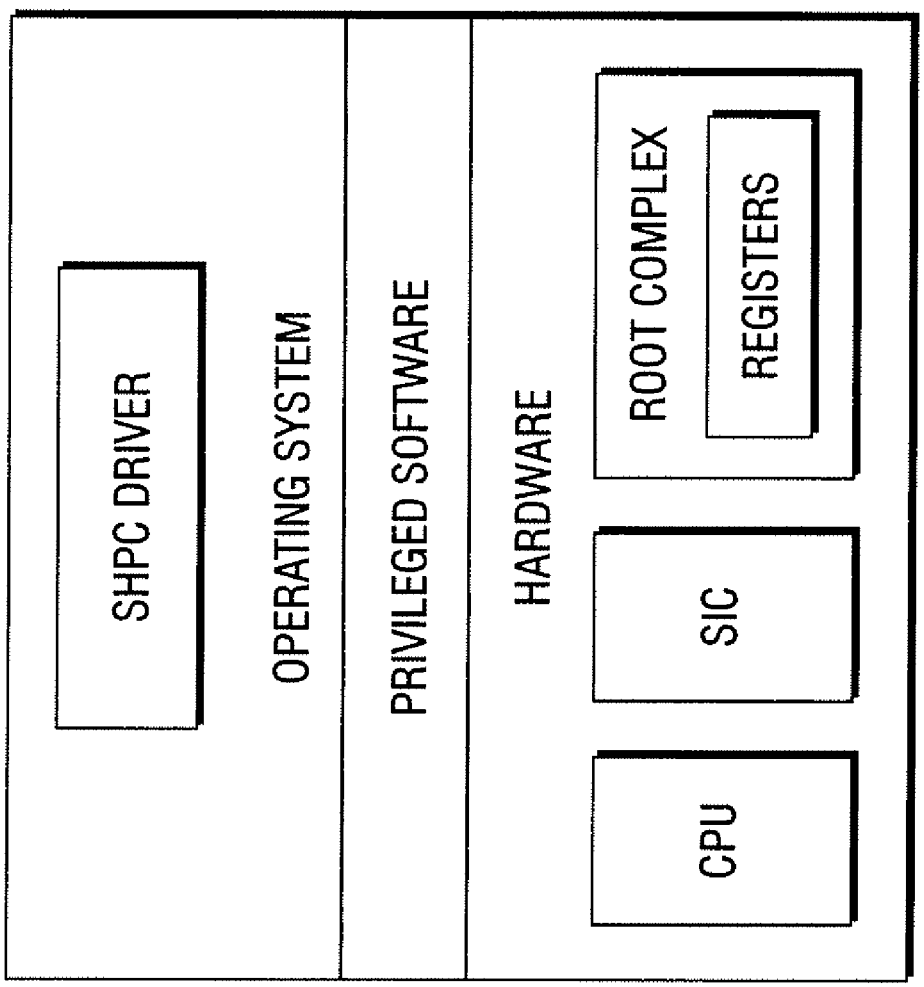
FIG. 4 illustrates privileged software in accordance with one non-limiting aspect of the present invention.

FIG. 4 illustrates a software stack having a privileged software layer between an operating system layer and a hardware layer. The operating system layer may include the operating system, drivers, applications, and other features, like the SHPC, used to control system operations. The hardware layer may include the physical implementations used to execute the operations desired by the operating system layer, including the above-described Root Complex, registers, CPU, and SIC.

The privileged software may be used to facilitate reading and writing of the values between the shadow and Root Complex registers in a manner that is transparent/unknown to the operating system layer so that the operations contemplated by the present invention can be executed without requiring changes to the SHPC, OS level drivers, etc. While the present invention is not intended to be limited to privileged software, the use of privileged software may be beneficial since it executes without requiring patches, updates or other software changes to other system elements and software. The privileged software may be configured to intercept instructions associated with the PCIe and SHPC operations and to execute the intercepted instructions so that it appears to the operating system and SHPC that the instructions were executed in a manner that is transparent to the movement of the pins to the SIC.

As one skilled in the art will appreciate, various SHPC/PCIe operations may result in changes to the Root Complex registers, generally a changing of one of the Root Complex bit register values to another value. The present invention contemplates operating transparently such these operations are executed without regard to the movement of the pins to the SIC. This may require automatically tracking any changes in the Root Complex registers within the shadow registers. The matching of the shadow registers to the Root Complex registers insures the slot sees the same value as the Root Complex registers and allows the SHPC/PCIe operations to execute on the Root Complex as if the Root Complexes were actually connected to the slot.

The changes to the Root Complex may be initiated from changes at the slot or changes elsewhere in the system. Changes at the slot are initially made to the SIC shadow registers since the SIC is the first element connected to the slot. Changes elsewhere in the system, i.e., changes initiated by the processor, SHPC, etc., are initially made to the Root Complex registers. Regardless of the origination of the register change, matching changes are made in the other corresponding registers.

If a change is initially made to one of the shadow registers, a corresponding change must be made to the Root Complex registers. The present invention contemplates hardwiring the other Root Complex register to the VSEC, which may be done in addition to or in place of the hardwiring described above with respect to the capabilities register. The privileged software may be configured to detect the changes in the shadow registers and to instruct the VSEC to write corresponding changes to the Root Complex registers. The SHPC/PCIe operations influenced by the changes may initiate once the changes are made to the Root Complex registers so that the corresponding operations may be executed as if the changes initially made to the shadow registers were actually made to the Root Complex registers.

If a change is initially made to one of the Root Complex registers, a corresponding change must be made to the shadow registers. The hardwiring of the Root Complex registers to the VSEC causes the values in the VSEC to change with changes to the Root Complex registers, i.e., when a SHPC/PCIe operation changes one of the Root Complex registers directly a corresponding change is indirectly made to the VSEC values. The privileged software may detect the change to the VSEC and initiate a corresponding change to the shadow registers. The changes to the shadow registers are necessarily communicated to the slot such that the changes initially made to the Root Complex registers appear as if they were actually communicated from the Root Complex registers.

While the present invention is described above with respect to a PCIe-based system, the present invention is not intended to be limited to any particular protocol or standard. The present invention contemplates its application to any environment where it may be beneficial to reduce the number of pins consumed by a Root Complex or SoC. The present invention is also not intended to be limited to the movement of the described pins from the Root Complex to the SIC and/or the interactions of the described elements. More or less registers and/or elements may be included in the system and configured in accordance with the present invention to reduce SoC pin count by moving some or all of the register-based information storage needs to shadow registers included on a less expensive chip or a chip having extra/more external pins.

As described above, one non-limiting aspect of the present invention relies on a Vendor Specific Enhanced Capability (VSEC) Structure. It may be a standard capability structure linked together with other capability structures. The contents of the VSEC beyond the first 8B may be vendor-specific. The VSEC registers may be defined to store any of the platform-specific information that needs to be made available in the capability registers. Hardwires may be used to wire the VSEC register bits to the corresponding bits of the capability registers. When software reads the capability registers, it sees the values written to the VSEC. The usage model for this is that low-level firmware or software that initializes the system after a power-on reset writes the VSEC as part of its routine.

After this software completes its work, it can hand control of the system over to the operating system, within which the PCIe nexus driver (for the Root Complex) and other PCIe device drivers operate. Capabilities related to the PCIe link itself may deserve special attention. If the VSEC is on a device other than the Root Complex, writing to it may require that the path to that device be functional. This may entail, for example, letting the link train to a default width and speed set at power-on reset. After the VSEC is written to establish the speed and width capabilities of the device, a PCIE Hot Reset can be performed to allow the link to re-train to the speed/width matching its capability and that for the device at the other end of the link.

One advantage of the present invention relates to eliminating the need for external pins or serial EEPROM to initialize platform-specific parameters in a PCI-Express Root Complex or Switch. Since pins are often costly and board real estate is precious, this invention can reduce system cost. The invention can provide a flexible solution to initializing platform-dependent parameters while minimizing cost to the chipset and printed-circuit board.

Another non-limiting aspect of the present invention relates to a mechanism for facilitating hot-plug command and status communication between the SoC and the SIC. The mechanism may rely on a VSEC used to store status from the slot. This register may be loaded as privileged or hyper-privileged software that receives an interrupt from the SIC when the SIC detects a change in one of the status pins from the slot (e.g. Attention Button pressed). The SIC can keep its own status register which operates as a shadow of the Slot Status Register. When privileged software receives the interrupt, it can copy the value in the SIC's status register to the VSEC in the Root Complex. The bits of this VSEC register may be hard-wired to the corresponding bits of the slot status register so that SHPC software can monitor status in a PCIe-compliant way. The slot status register retains its read-only property, since the loading of it is down through the VSEC "back-door" mechanism.

When the SHPC driver software writes to the slot control register, to enable power for example, the Root Complex can generate an interrupt to the privileged software indicating there was a change in this register. The privileged software can then read the slot control register and copy its contents to a shadow control register in the SIC. The bits of this shadow register can drive the output pins to the slot.

Communication of a slot control register change may include the following steps:

1) The operating system wants to change a hot plug control line on a hot-pluggable slot and so it checks the completed bit of the slot status register in PCIe configuration space for the given port. If the bit is 0, it waits and tries again later; otherwise, it writes the slot control register. (Note that multiple bits in the slot control register may be updated in one write.) Hardware clears the command completed bit of the slot status register.

2) The Root Complex can assert an interrupt that is passed by the interrupt register (IU) to the CPU core (or a targeted core if there are multiple cores; how a specific CPU is targeted is beyond the scope of this invention).

3) After it receives the interrupt, the privileged software (PSW) can look at the IU registers to figure out what caused the interrupt.

4) PSW can note that the interrupt was caused by a change in the slot control register.

5) PSW can check to see what changed in the slot control register.

6) PSW can communicate the change to the SIC across the SIC/SoC bus. It can move the Slot Control Register value to the SIC data register in the IU and the data is sent to the SIC over the SIC/SoC bus.

7) The SIC/SoC bus interface in the FPGA can directly write the SIC Shadow Hot Plug Control register, which causes the Hot Plug wire(s) to immediately transition to their new level(s).

8) PSW writes the Command Completed bit of the Slot Status Register to 1, so that a subsequent write to the Slot Control Register can occur.

Communication of slot status change to SoC may include the following steps:

1) Any change in a Hot Plug sense wire (e.g. Attention Button) may generate an interrupt from the SIC to the SoC, which may be serviced by the Hypervisor; that is, the interrupt should not be visible to the operating system.

2) An interrupt from the SIC can generate a subsequent interrupt to the CPU core(s).

3) PSW can figure out why the interrupt occurred. This interrogation can be done through register reads done to the SIC register recording hot plug wire status.

4) PSW can gather Hot Plug wire status from the SIC register and write the status to the VSEC in the Root Complex PCIe configuration space. The VSEC bits can be wired to input pins of the corresponding bits of the Slot Status Register. This "back door" access is done rather than having the PSW write to the Slot Status Register directly, because the Slot Status Register can be defined as read-only for software.

5) The Slot Status Register can generate an interrupt to the CPU core(s) when the slot status register value changes.

As required, detailed embodiments of the present invention are disclosed herein; however, it is to be understood that the disclosed embodiments are merely exemplary of the invention that may be embodied in various and alternative forms. The figures are not necessarily to scale, some features may be exaggerated or minimized to show details of particular components. Therefore, specific structural and functional details disclosed herein are not to be interpreted as limiting, but merely as a representative basis for the claims and/or as a representative basis for teaching one skilled in the art to variously employ the present invention.

What is claimed is:

1. A method of facilitating Peripheral Component Interconnect Express (PCIe), the method comprising:
    configuring a Vendor Specific Enhanced Capabilities (VSEC) structure included within PCIe configuration space of a Root Complex to set bits for one or more Root Complex registers configured to support PCIe operations with a PCIe device;
    setting one or more of the Root Complex registers to support PCIe operations with signals communicated from the VSEC structure over signal paths restricted to the Root Complex;
    communicating register signals reflective of at least portion of bits set for the Root Complex registers and needed to support the PCIe operations to a PCIe device without communicating the signals over registers pins dedicated to the Root Complex registers; and
    communicating the register signals over pins connected to one or more shadow registers having settings that mirror the settings of one or more of the Root Complex registers.

2. The method of claim 1 further comprising using the VSEC structure to set Root Complex registers for slot control, slot status, and slot capabilities.

3. The method of claim 2 further comprising shadowing the settings of the slot control and slot status registers within shadow slot control and slot status registers of a slot interface chip (SIC), and exchanging signals between the PCIe device and the shadow registers and not the Root Complex status and control registers when supporting PCIe operations.

4. The method of claim 3 further comprising setting the VSEC with instructions from privileged software executing on a processor that communicates with the Root Complex over a data bus.

5. The method of claim 4 further comprising the software instructing the VSEC to set the Root Complex registers to match with changes in the shadow registers if the PCIe device induces changes to the shadow registers.

6. The method of claim 4 further comprising the privileged software changing the shadow registers to match changes in the Root Complex registers if operating system software changes the Root Complex register.

7. The method of claim 1 further comprising communicating the register signals to the shadow registers over a bus connecting the Root Complex to a slot interface chip (SIC) having the shadow registers.

8. The method of claim 1 further comprising configuring the VSEC and setting the Root Complex register with instructions issued from privileged software operating between an operating system supporting PCIe and a hardware system supporting the Root Complex.

9. The method of claim 1 further comprising configuring the VSEC and setting the Root Complex registers to support hot-plug operations.

10. A PCIe system comprising:
    a Root Complex having a number of registers configured to support PCIe operations for a slot having a PCIe device;
    a slot interface chip (SIC) connected to the slot and having shadow registers for Root Complex registers that are required to communicate with the slot;
    software configured to shadow values in the Root Complex registers within the corresponding shadow registers, the shadow registers thereby mirroring the Root Complex registers so that PCIe operations intended to be executed through the Root Complex registers are instead executed through the shadow registers connected to the slot; and
    wherein the Root Complex includes a VSEC hardwired to the Root Complex registers such that changes in the either of the VSEC or Root Complex registers are automatically reflected in the other, wherein the privileged software is configured to:
    instruct the VSEC to write changes in the shadow register to the Root Complex registers if the shadow registers change in response to slot changes; and
    write changes in the Root Complex registers to the shadow registers in response to the VSEC detecting the changes in the Root Complex registers, where those changes are made by operating system software.

11. The system of claim 10 wherein the software is privileged software.

12. The system of claim 10 wherein the Root Complex is only able to communicate with the slot through the SIC.

13. The system of claim 12 wherein the Root Complex is connected to SIC through a serial bus.

14. The system of claim 10 wherein the Root Complex includes a standard hot-plug controller (SHPC).

15. The system of claim 14 wherein the software operations below the SHPC such that the connection of the slot to the SIC is transparent to the SHPC.

16. A method of facilitating Peripheral Component Interconnect Express (PCIe), the method comprising:
    shadowing Root Complex registers with shadow Root Complex registers connected to PCIe device so that a PCIe device controller interacts with the Root Complex registers as if the Root Complex registers are connected to and communicated with the PCIe device while the PCIe device is actually connected to and communicating with the shadow Root Complex registers; and
    connecting PCIe devices only to pins dedicated to the shadow Root Complex register.

17. The method of claim 16 further comprising shadowing the registers at least partially through software instructions exchanged with a VSEC included on the Root Complex.

* * * * *